United States Patent Office 3,127,137
Patented Mar. 31, 1964

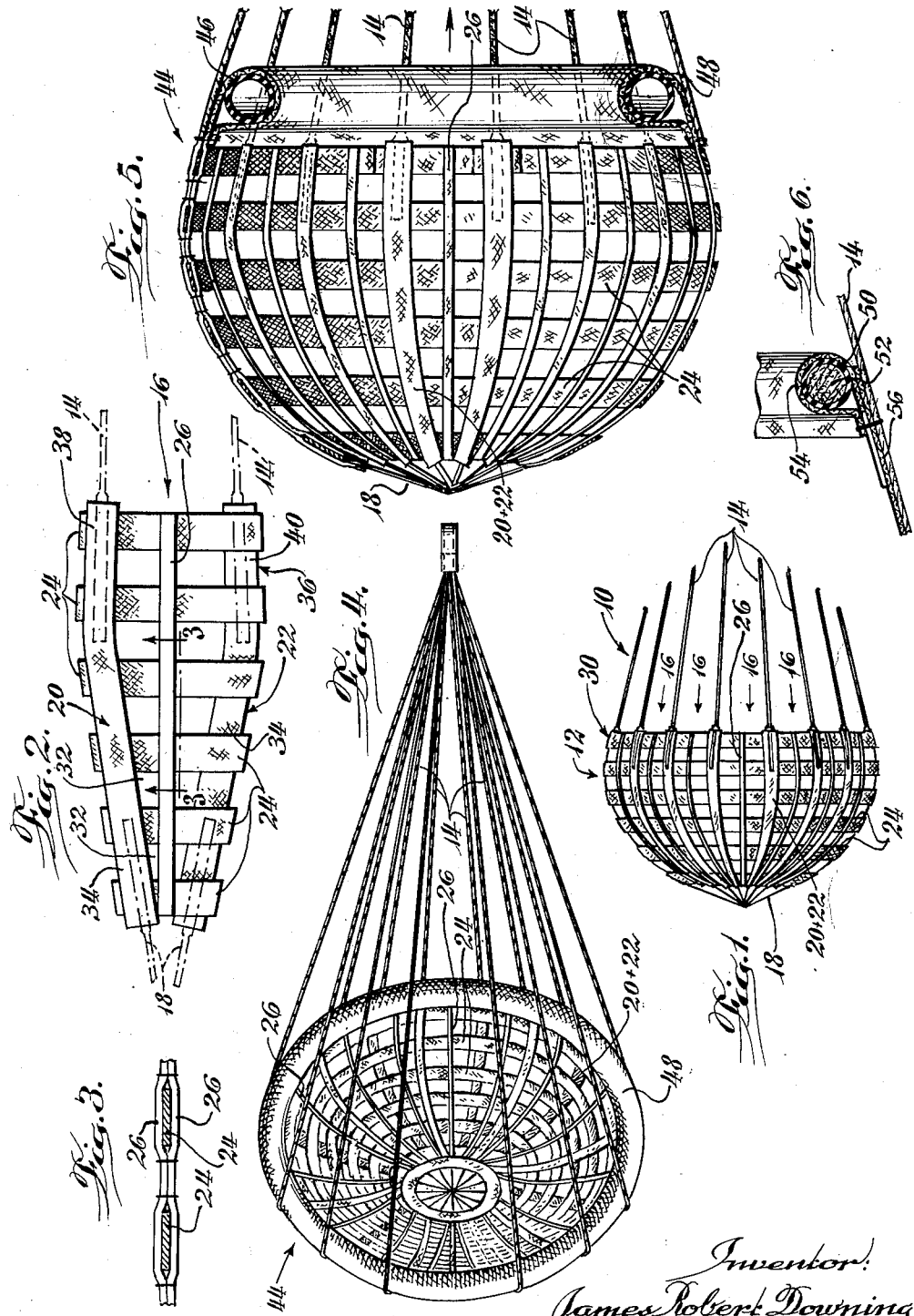

3,127,137
PARACHUTE
James Robert Downing, Palos Verdes, Calif., assignor to Cook Electric Company, Chicago, Ill., a corporation of Delaware
Filed May 11, 1960, Ser. No. 28,418
2 Claims. (Cl. 244—145)

This invention relates to new and improved parachutes which are intended particularly for use as deceleration or drag-type devices at supersonic speeds. Such parachutes have many uses. For example, they may be used in escape systems, whereby the pilot or some other crew member of a supersonic aircraft may escape or eject himself from the aircraft when an emergency situation develops while the aircraft is traveling at supersonic speed. For such applications, a drag-type parachute is often used to decelerate the pilot and his escape capsule to a speed at which it will be safe to open his main parachute. Drag-type parachutes are also employed in space recovery systems, whereby a capsule is recovered after re-entering the earth's atmosphere after a flight into outer space.

Investigations conducted in recent years have indicated that conventional parachutes exhibit considerably reduced performance capabilities in applications involving operation at supersonic speeds. Prior to the present invention, various types and sizes of parachutes have been designed and tested for applications involving both subsonic and supersonic recovery operations. Such parachutes have been subjected to rocket sled, free flight and wind tunnel tests in order to determine their characteristics and established criteria for future designs. Consequently, the state of the art has been advanced to a point such that drag-type parachute designs are available which are suitable for applications involving opening velocities up to about Mach 1.5 (1.5 times the speed of sound). However, none of the available parachute types has permitted satisfactory operation at higher speeds. Tests of prior parachutes have been characterized by violent canopy breathing or pulsing and associated reduced drag. In addition, such tests have disclosed shock pattern fluctuations which are affected by the flexibility of the canopy material. In some cases, such tests have led to failure of the parachute material due to violent oscillation of the material.

One important object of the present invention is to satisfy the need for a deceleration parachute which further advances the state of the art by providing satisfactory performance characteristics at least through Mach 2 (twice the speed of sound). It has been shown by extensive tests that the parachutes of the present invention are capable of operating satisfactorily at Mach numbers through 2.0, while rendering negligible the above mentioned undesirable characteristics of the prior parachutes. The parachutes of the present invention incorporate features which greatly reduce or eliminate flutter and instability in the peripheral regions of the canopy, due to flow interaction.

A further object of the present invention is to provide new and improved parachutes which maintain a high degree of inflation stability at supersonic speeds at least up to Mach 2.

Further objects and advantages of the present invention will appear from the following description, taken with the accompanying drawings, in which:

FIG. 1 is an elevational view of a parachute to be described as an illustrative embodiment of the present invention.

FIG. 2 is an elevational view showing the layout of one of the gores employed in the parachute of FIG. 1.

FIG. 3 is a cross-sectional view, taken generally along a line 3—3 in FIG. 2.

FIG. 4 is a perspective view of a modified parachute having an inflatable member in its skirt or peripheral portion.

FIG. 5 is an elevational sectional view taken through the modified parachute of FIG. 4.

FIG. 6 is a fragmentary sectional view showing another modified construction in which the skirt of the parachute is provided with a member filled with resilient foam material.

It will be seen that the parachute 10 of FIG. 1 comprises a canopy 12 having a plurality of shroud lines 14 extending from the skirt or periphery thereof. The parachute is shown in a horizontal position because it is intended primarily for use as a deceleration or a drag-type parachute.

The illustrated parachute 10 is of the ribbon type, in which the canopy 12 is made up of a plurality of crisscrossed ribbons forming a mesh-type structure. It is preferred to form the parachute 10 from a plurality of gores 16. The number of gores 16 in the parachute may be varied to suit varying needs. For example, the illustrated parachute may have sixteen gores. It will be understood that the gores are sewn securely together. Lines 18 may be sewn across the ends of the gores to reinforce the crown of the canopy 12.

FIG. 2 shows a typical gore layout for the illustrated parachute. It will be seen that each of the illustrated gores 16 comprises two radial ribbons 20 and 22 which extend between the crown and the skirt of the parachute 10. A plurality of parallel lateral ribbons 24 extend between the radial ribbons 22. The lateral ribbons 24 are equally spaced between the crown and the skirt of the parachute. A central longitudinal ribbon 26 is positioned midway between the radial ribbons 20 and 22. It will be seen that the longitudinal ribbon 26 is connected to the central portions of the lateral ribbons 24. As shown, the longitudinal ribbon 26 extends perpendicular to the lateral ribbons 24. It is preferred to form the longitudinal ribbon 26 with two plies so that it extends on both sides of the lateral ribbons 24, as shown to best advantage in FIG. 3.

The gores 16 are securely sewn together with the radial ribbons 20 and 22 of adjacent gores overlapping. Thus, in assembling the parachute, the radial ribbon 20 of one gore is positioned over the radial ribbon 22 of the adjacent gore, and then the two ribbons are sewn securely together. It will be seen that the lateral ribbons 24 are sewn to the underside of the radial ribbon 20, while being sewn to the upper side of the radial ribbon 22. Thus, the lateral ribbons 24 are disposed between the radial ribbons 20 and 22 of adjacent gores when the gores are sewn together. At the skirt 30 of the parachute 10, the lateral ribbons 24 may be reinforced with one or more additional plies of ribbon material, extending continuously around the skirt. The shroud lines 14 and the top lines 18 are preferably sewn securely to the radial ribbons 20 and 22. The ribbons 20, 22, 24 and 26 are arranged to form a mesh having a plurality of four-sided openings 32 between the ribbons.

It will be seen that the radial ribbons 20 and 22 have upper or main portions 34 which converge radially toward the crown of the parachute. Thus, the converging portions 34 are angled oppositely with respect to the lateral ribbons 24. The longitudinal ribbon 26 bisects the angle between the converging portions 34.

Each gore 16 has a skirt portion 36 which is specially formed to prevent or greatly minimize the tendency of the skirt 30 of the parachute to flutter or dance violently at supersonic speeds. It will be seen that the skirt portion 36 of the gore 16 is reduced substantially in width so as to eliminate excess material and increase the peripheral tension in the skirt of the parachute. Thus, the radial ribbons, 20 and 22 have skirt or lower portions 38 and 40 which are swung inwardly and toward each other from the radial lines of the upper portions 34. In the illustrated construction, the lower portions 38 and 40 actually angle toward each other as they approach the skirt of the parachute. Thus, the lowermost lateral ribbon 24 is actually shorter than the second to the lowermost ribbon. This tightening of the skirt of the parachute is one of the characteristic features of the present invention.

The ability of a parachute canopy to remain adequately inflated under load is in part dependent upon a factor involving the difference between the inside and outside pressure near the skirt to the inside pressure. As the Mach number increases beyond one, this factor tends to decrease. Thus, the canopy inflation characteristic, and hence the relative tension in the peripheral skirt members, is reduced. As a result of the skirt members being only in light tension when exposed to the turbulent airflow, they have a tendency to flutter violently. Sometimes this fluttering causes failure of the skirt members. The parachute of the present invention greatly reduces this tendency by drawing in or tightening the skirt portion of the parachute so that excess material at this point will be avoided. The exact angle between the lower radial ribbon portions 38 and 40 may be varied, but the effect is always to tighten or draw in the skirt portion of the parachute.

FIGS. 4 and 5 show a modified parachute 44 which is similar to the parachute 10, except that even greater inflation stability and freedom from flutter are achieved by providing the skirt portion of the parachute with an inflated annular member 46, which may be made of synthetic rubber or other suitable material. It will be seen that the member 46 is in the form of an annular tube which is circular in cross section. A fabric cover 48 may be wrapped around the tube 46 and may be securely sewn to the skirt of the parachute 44 so as to retain the tube 46 on the parachute. The tube 46 may be inflated with air or some other suitable gas. It will be seen that the inflated tube 46 is disposed just within the shroud lines 14. The inflated tube 46 positively maintains full opening of the skirt of the parachute, while increasing the tension in the skirt members of the canopy. Thus, the skirt of the parachute will be kept from fluttering, and the inflation of the parachute will be maintained in a stable manner.

Alternatively, the skirt of the parachute may be reinforced with variously shaped skirt beads or edge thickening materials, securely sewn in at the skirt of the parachute, to give improved inflation characteristics. FIG. 6 illustrates such a modified arrangement in which the skirt of the parachute is reinforced with a tube 50 which is filled with resilient material 52, such as polyurethane foam, rubber foam, or the like. A fabric wrapper 54 may be disposed around the tube 50 and may be sewn securely to the peripheral skirt member 56 of the parachute.

By extensive tests it has been established that the parachutes of the present invention will perform satisfactorily at air speeds at least up to Mach 2, with or without the inflated tube or other skirt reinforcing member. It is believed that the parachutes of the present invention will give highly satisfactory performance characteristics in even higher speed applications.

Various other modifications, alternative constructions and equivalents may be employed without departing from the true spirit and scope of the invention as exemplified in the foregoing description and defined in the following claims.

I claim:

1. In a parachute, the combination comprising a circular generally dome-shaped canopy comprising a plurality of gores sewn together, each of said gores consisting of a pair of radial border ribbons extending between the crown and the edge of said canopy, a plurality of parallel lateral ribbons secured to and extending between said radial ribbons, and a central ribbon disposed midway between said radial ribbons and secured to said lateral ribbons, said ribbons having open spaces therebetween, said radial ribbons of each gore having upper portions converging toward the crown of said canopy, said radial ribbons having lower portions angling toward each other and toward the edge of said canopy, the lowermost lateral ribbon in each gore thereby being shorter than the second to the lowermost lateral ribbon, the edge portion of said canopy thereby being of a smaller circumference than the portion of said canopy immediately above said edge portion so as to minimize fluttering of the edge portion at supersonic speeds, said central ribbon being at right angles to all of said lateral ribbons, and a plurality of shroud lines connected to the lower ends of said radial ribbons while leaving said central ribbons free of said shroud lines.

2. In a parachute, the combination comprising a circular generally dome-shaped canopy comprising a plurality of gores sewn together, each of said gores consisting of a pair of radial border ribbons extending between the crown and the edge of said canopy, a plurality of parallel lateral ribbons secured to and extending between said radial ribbons, and a central ribbon disposed midway between said radial ribbons and secured to said lateral ribbons, said ribbons having open spaces therebetween, said radial ribbons of each gore having upper portions converging toward the crown of said canopy, said radial ribbons having lower portions angling toward each other and toward the edge of said canopy, the lowermost lateral ribbon in each gore thereby being shorter than the second to the lowermost lateral ribbon, the edge portion of said canopy thereby being of a smaller circumference than the portion of said canopy immediately above said edge portion so as to minimize fluttering of the edge portion at supersonic speeds, said central ribbon being at right angles to all of said lateral ribbons, a plurality of shroud lines connected to the lower ends of said radial ribbons while leaving said central ribbons free of said shroud lines, and an enlarged annular bead secured to and extending around said edge portion of said canopy for stabilizing the inflation of said canopy at supersonic speeds, said bead comprising an annular tube filled with resilient foam material.

References Cited in the file of this patent

UNITED STATES PATENTS

| 2,500,170 | Fogel | Mar. 16, 1950 |
| 2,581,808 | Moran | Jan. 8, 1952 |
| 2,695,045 | Smith et al. | Nov. 23, 1954 |
| 2,730,315 | Fogal et al. | Jan. 10, 1956 |

FOREIGN PATENTS

| 617,903 | France | Nov. 30, 1926 |
| 1,094,964 | France | Dec. 15, 1954 |
| 888,370 | Germany | Aug. 31, 1953 |

OTHER REFERENCES

Brown, W. D., Parachutes, London, Sir Isaac Pitman & Sons, Ltd., first published 1951, pp. 140–141.